United States Patent
Li et al.

(10) Patent No.: US 8,433,204 B2
(45) Date of Patent: Apr. 30, 2013

(54) DQPSK DEMODULATOR

(75) Inventors: Huiping Li, Shanghai (CN); Xiaolin Chen, Shanghai (CN); Fan Chen, Shanghai (CN); Fahua Lan, Shanghai (CN); Dapeng Kevin Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 279 days.

(21) Appl. No.: 12/978,244

(22) Filed: Dec. 23, 2010

(65) Prior Publication Data

US 2011/0188867 A1 Aug. 4, 2011

(30) Foreign Application Priority Data

Dec. 23, 2009 (CN) .......................... 2009 1 0262076

(51) Int. Cl.
   *H04B 10/04* (2006.01)
(52) U.S. Cl.
   USPC ........... 398/188; 398/140; 398/141; 398/161; 398/201; 398/212; 359/325
(58) Field of Classification Search ................. 398/140, 398/141, 153, 161, 169, 170, 174, 183, 188, 398/201, 202, 207, 212; 359/325
   See application file for complete search history.

(56) References Cited

U.S. PATENT DOCUMENTS

| 7,411,725 | B2 * | 8/2008 | Suzuki et al. | 359/325 |
| 7,526,210 | B2 * | 4/2009 | Liu | 398/188 |
| 8,004,749 | B1 * | 8/2011 | Hsieh et al. | 359/325 |
| 8,068,273 | B2 * | 11/2011 | Shimizu et al. | 359/325 |
| 8,164,824 | B2 * | 4/2012 | Shimizu et al. | 359/325 |
| 8,218,975 | B2 * | 7/2012 | Tian et al. | 398/202 |
| 8,270,067 | B1 * | 9/2012 | Hsieh et al. | 359/325 |

* cited by examiner

*Primary Examiner* — M. R. Sedighian
(74) *Attorney, Agent, or Firm* — Maschoff Brennan

(57) ABSTRACT

A phase shift keyed demodulator includes first and second beam splitters, a first optical path, a second optical path, and a wavelength tuner. The first beam splitter splits an input signal into first and second output signals. The second beam splitter splits each first and second output signal into a transmitted signal and a reflected signal. The first optical path includes an optical path of each transmitted signal from a beam splitting surface to a reflector and back to the beam splitting surface. The second optical path includes an optical path of each reflected signal from the beam splitting surface to a mirror surface and back to the beam splitting surface. A path difference introduces a delay between the transmitted signal and the reflected signal. The wavelength tuner tunes the demodulator to a predetermined central wavelength and introduces a phase shift between first and second transmitted signals.

20 Claims, 8 Drawing Sheets

DQPSK DEMODULATOR

CROSS-REFERENCE TO RELATED APPLICATIONS

This application claims the benefit of Chinese Patent Application No. 200910262076.0, titled DQPSK DEMODULATOR, filed Dec. 23, 2009, which is incorporated herein by reference in its entirety.

BACKGROUND

1. Field of the Invention

Embodiments of the present invention relate to the demodulation of optical signals. Some example embodiments relate more particularly to the demodulation of phase shift keyed signals.

2. Related Technology

A phase shift keyed (PSK) optical signal typically includes a return-to-zero (RZ) signal having a series of relatively high intensity pulses separated by low intensity regions. For a differential PSK optical signal, the phase difference between adjacent pulses encodes information. For example, in some encoding schemes, a phase difference of it encodes a one bit whereas a phase difference of zero or $2\pi$ encodes a zero bit. PSK signals have a distinct advantage in that both the zero bit and the one bit contain the same amount of optical energy, which enables a higher signal-to-noise ratio (SNR) at a demodulator as compared to encoding methods where a logical zero is encoded by a signal portion having a lower intensity than a logical one.

Demodulation of a PSK signal includes converting the phase information encoded in the pulses into amplitude modulation such that the data can be detected by means of a photodiode or other optical sensor. In a conventional demodulator, this is a accomplished by means of a delay line interferometer ("DLI"), such as a Mach-Zehnder interferometer or Michelson interferometer. A DLI operates by dividing an input signal into first and second signals. The first and second signals travel along paths of different lengths and are then rejoined into one or more output signals. The difference in path length is chosen such that upon recombining, the first and second signals will constructively and/or destructively interfere with one another depending on the phase difference between adjacent pulses.

The subject matter claimed herein is not limited to embodiments that solve any disadvantages or that operate only in environments such as those described above. Rather, this background is only provided to illustrate one exemplary technology area where some embodiments described herein may be practiced

SUMMARY OF SOME EXAMPLE EMBODIMENTS

In general, some example embodiments relate to a demodulator configured to demodulate phase shift keyed signals.

In one example embodiment, a PSK demodulator includes first and second small incident angle beam splitters, a first optical path, a second optical path, an optical path difference compensator and a wavelength tuner. The first small incident angle beam splitter is configured to split an input signal into first and second output signals. The second small incident angle beam splitter is positioned to receive the first and second output signals and is configured to simultaneously split each of the first and second output signals into a transmitted signal and a reflected signal. The first optical path is defined by an optical path of each transmitted signal from a 50:50 beam splitting surface of the second small incident angle beam splitter to a reflector and back to the 50:50 beam splitting surface. The second optical path is defined by an optical path of each reflected signal from the 50:50 beam splitting surface to a mirror surface of the second small incident angle beam splitter and back to the 50:50 beam splitting surface. The optical path difference compensator is positioned in the first optical path and is configured to substantially maintain a predetermined difference between a length of the first optical path and a length of the second optical path under varying temperature conditions. The predetermined difference is configured to introduce a delay between the transmitted signal and the reflected signal, each transmitted signal and corresponding reflected signal interfering with each other to generate a constructive interference signal and a destructive interference signal. The wavelength tuner is positioned in the first optical path. The wavelength tuner is configured to tune the demodulator to a predetermined central wavelength and to introduce a phase shift between a first transmitted signal generated from the first output signal and a second transmitted signal generated from the second output signal.

In another example embodiment, a PSK demodulator includes first and second non-polarization dependent beam splitters, a first optical path, a second optical path, and a wavelength tuner. The first non-polarization dependent beam splitter is configured to split an input signal into first and second output signals. The second non-polarization dependent beam splitter is positioned to receive the first and second output signals and is configured to simultaneously split each of the first and second output signals into a reflected signal and a transmitted signal. The first optical path is defined by an optical path of each reflected signal from a 50:50 beam splitting surface of the second non-polarization dependent beam splitter to a first prism and back to the 50:50 beam splitting surface. The second optical path is defined by an optical path of each transmitted signal from the 50:50 beam splitting surface to a second prism and back to the 50:50 beam splitting surface. The first optical path is different in length than the second optical path, the length difference configured to introduce a delay between the reflected signal and the transmitted signal, each reflected signal and corresponding transmitted signal interfering with each other at the 50:50 beam splitting surface to generate a constructive interference signal and a destructive interference signal. The wavelength tuner is positioned in the second optical path. The wavelength tuner is configured to tune the demodulator to a predetermined central wavelength and to introduce a phase shift between a first transmitted signal generated from the first output signal and a second transmitted signal generated from the second output signal.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It should be understood that the drawings are diagrammatic and schematic representations of exemplary embodiments of the invention, and are not limiting of the present invention, nor are the drawings necessarily drawn to scale.

I. Example Operating Environment

Figure 1:
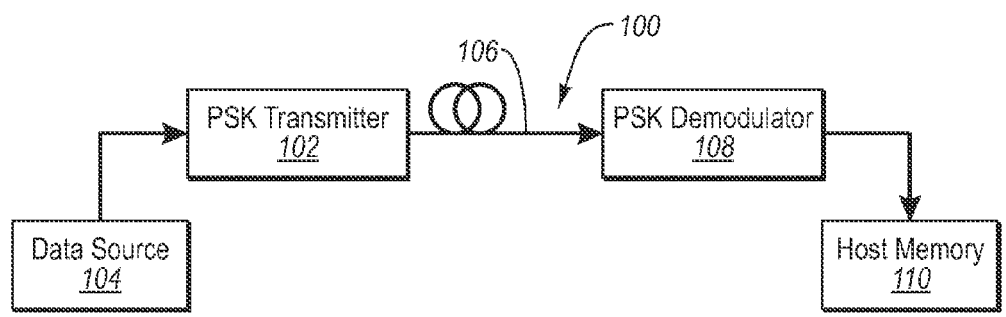
FIG. 1 illustrates a fiber optic communication system suitable for use in accordance with some embodiments.

Referring to FIG. 1, an operating environment 100 suitable for use in accordance with some embodiments includes a phase-shift keyed (PSK) transmitter 102 that encodes data from a data source 104 into a PSK optical signal. The PSK transmitter 102 encodes the data into a differential phase shaft keyed signal (DPSK) or a differential quadrature phase-shift keyed signal (DQPSK). The PSK signal generated by the PSK transmitter 102 is transmitted over an optical fiber 106 to a PSK demodulator 108. The PSK demodulator 108 converts the PSK signal into a data symbol, which is then transmitted to another device for storage and/or processing, such as a memory 110 of a host device.

Figure 2A:
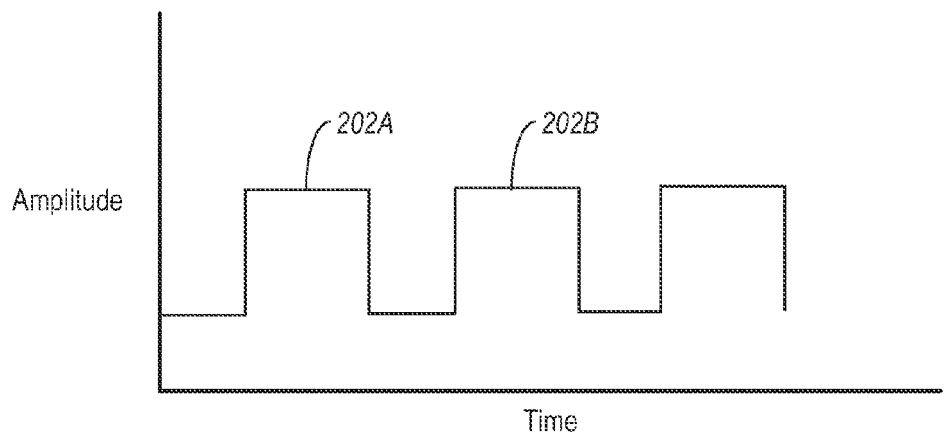
FIGS. 2A and 2B illustrate attributes of a DPSK signal suitable for demodulation in accordance with some embodiments.
Figure 2B:
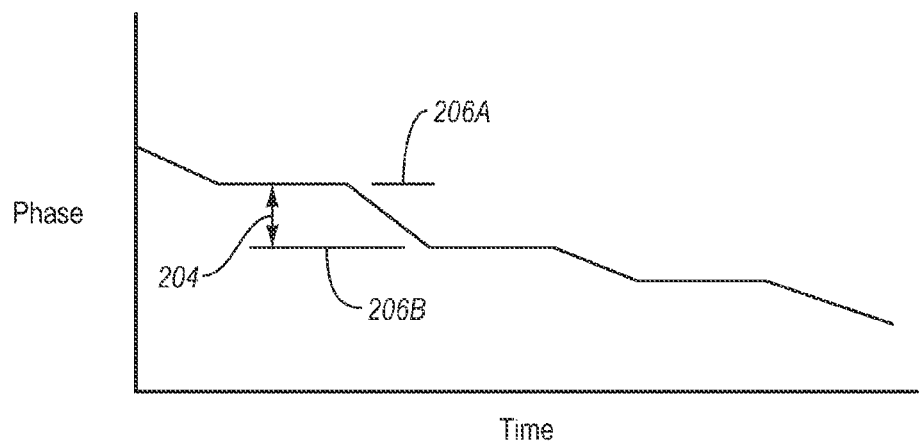

Referring to FIG. 2A, a PSK signal, such as a DPSK signal or a DQPSK signal, may have the illustrated return-to-zero (RZ) amplitude profile including pulses 202A, 202B separated by local minima. Each pulse 202B has a phase difference 204 relative to a preceding pulse 202A as shown by the phase profile of FIG. 2B. The phase difference 204 between the phases 206A, 206B of the pulses 202A, 202B, respectively, encodes information. In an example DPSK modulation scheme, a phase difference 204 of $\pi$ encodes a one bit whereas a phase difference 204 of 0 or a multiple of $2\pi$ encodes a zero bit. In an example DQPSK modulation scheme, phase differences 204 of 0, $\pi/2$, $\pi$, and $3\pi/2$ are each assigned a unique two-bit value. For instance, phase differences 204 of 0, $\pi/2$, $\pi$, and $3\pi/2$ are assigned unique two-bit values of 00, 01, 11 and 10, respectively, according to some embodiments.

II. First Embodiment

Figure 3A:
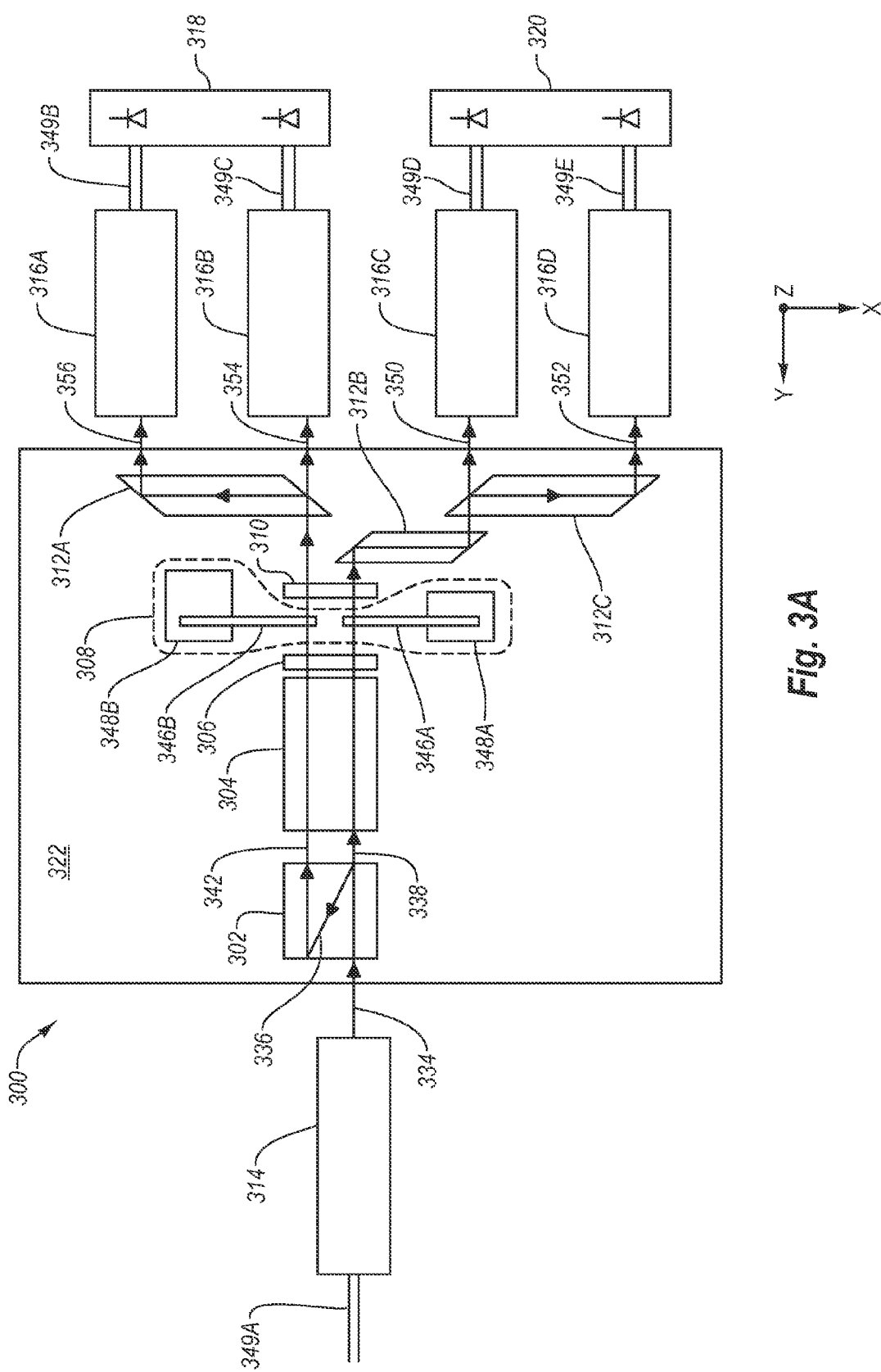
FIGS. 3A and 3B illustrate a first embodiment of a DQPSK demodulator that is configured to be implemented in the fiber optic communication system of FIG. 1.
Figure 3B:
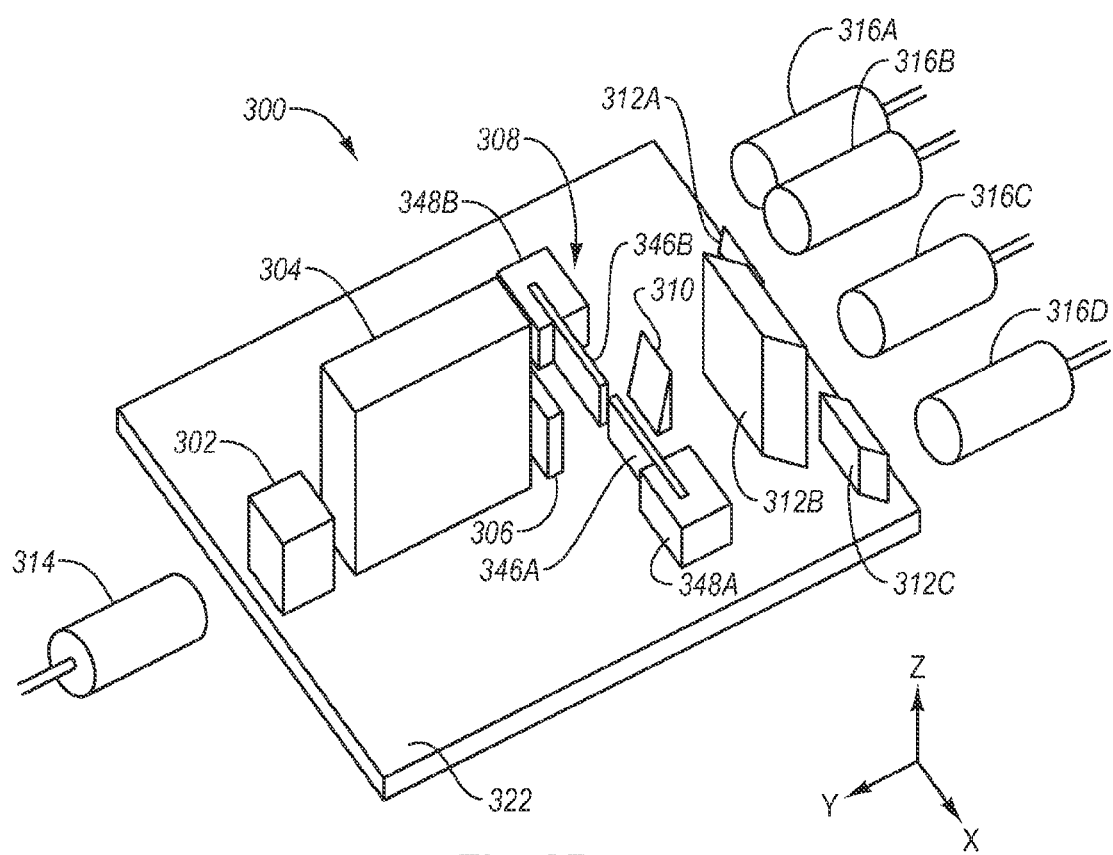

Referring to FIGS. 3A and 3B, a demodulator 300 according to a first example embodiment is disclosed. FIG. 3A illustrates a top view and FIG. 3B illustrates an isometric view of the demodulator 300. The demodulator 300 includes a first beam splitter 302, a second beam splitter 304, an optical path difference ("OPD") compensator 306, a wavelength tuner 308 and a reflector 310. Optionally, the demodulator 300 further includes one or more redirecting elements 312A-312C, an input collimator 314, and a plurality of output collimators 316A-316D. Alternately or additionally, the demodulator 300 further includes one or more paired optical detectors 318, 320, illustrated in FIG. 3A. In some embodiments, the first and second beam splitters 302, 304, OPD compensator 306, wavelength tuner 308, reflector 310 and redirecting elements 312A-312C are disposed on a substrate 322.

A. Beam Splitters

Each of the first and second beam splitters 302, 304 is a non-polarization dependent beam splitter according to some embodiments. As such, each of the first and second beam splitters 302, 304 is configured to split an input signal into two output signals of approximately equal power without regard to the polarization state of the input signal.

Further, in the illustrated example, each of the first and second beam splitters 302, 304 is a small incident angle beam splitter. In particular, each of the first and second beam splitters includes a beam splitting surface having a normal line that is at an angle $\theta$ relative to a corresponding input signal, the angle $\theta$ being between 7 degrees and 15 degrees. In some embodiments, the angle $\theta$ is approximately 10 degrees. The first and second beam splitters 302, 304 have normal lines that are at the same or different angles $\theta$ relative to a corresponding input signal(s).

Figure 3C:
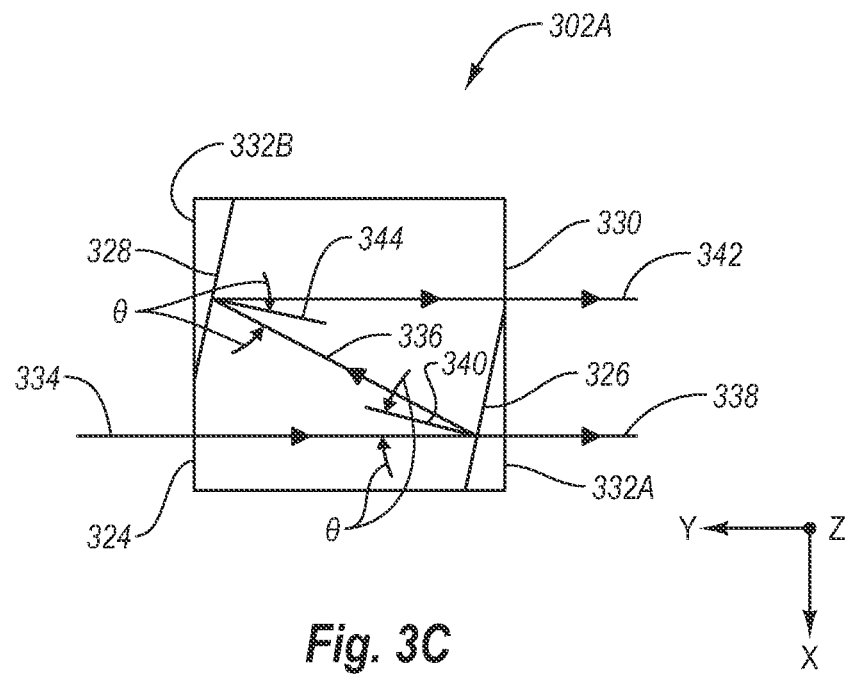
FIGS. 3C and 3D illustrate two examples of a first small incident angle beam splitter that is configured to be implemented in the DQPSK demodulator of FIGS. 3A and 3B to generate two output signals from an input signal.
Figure 3D:
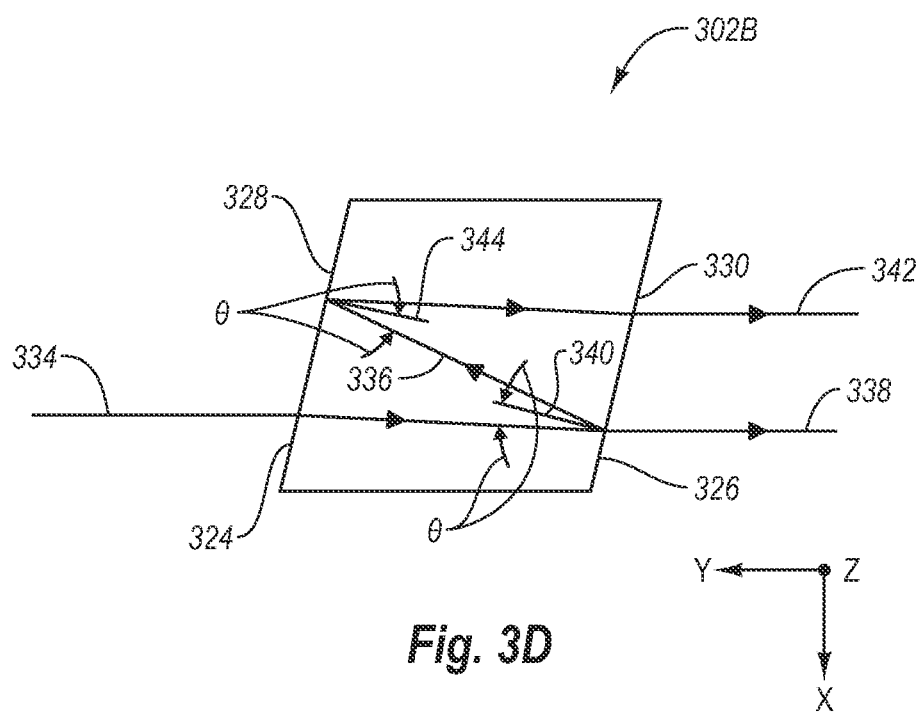

FIGS. 3C and 3D depict examples of a small incident angle beam splitter 302A, 302B that corresponds to the beam splitter 302 of FIGS. 3A and 3B according to some examples. Each of the small incident angle beam splitters 302A, 302B is made of fused silicon in some embodiments. In the example of FIGS. 3C and 3D, the small incident angle beam splitter 302A, 302B includes an input surface 324, a 50:50 beam splitting surface 326, a mirror surface 328, and a transmission surface 330. Optionally, one or more right angle prisms 332A, 332B are coupled to the 50:50 beam splitting surface 326 and the mirror surface 328 in the small incident angle beam splitter 302A of FIG. 3C.

The input surface 324 and the transmission surface 330 both include an anti-reflective coating so as to substantially prevent signals incident on those surfaces from being reflected.

The 50:50 beam splitting surface 326 includes a plurality of layers of periodically varying index of refraction. For instance, in this and other examples, the plurality of layers includes alternating layers of two materials, each material having a different index of refraction. In some embodiments, each layer has a thickness of approximately $\lambda/4$, where $\lambda$ is the wavelength of an input signal. Alternately or additionally, the plurality of layers includes approximately 6 layers.

The periodically varying index of refraction of the 50:50 beam splitting surface 326 is selected so as to split an input signal 334 into two signals. In particular, the 50:50 beam splitting surface 326 splits the input signal 334 into a reflected signal 336 that is reflected towards the mirror surface 328 and a first output signal 338 that is transmitted though the 50:50 beam splitting surface 326. In some examples, the input signal 334 is a phase-modulated DQPSK signal.

As further illustrated in FIG. 3C, the 50:50 beam splitting surface 326 has a normal line 340. The small incident angle beam splitter 302A is positioned so that the input signal 334 is incident on the 50:50 beam splitting surface 326 at an angle θ relative to the normal line 340 of 50:50 beam splitting surface 326. The angle θ is between 7 degrees and 15 degrees in some embodiments. Alternately or additionally, the angle θ is approximately 10 degrees.

The mirror surface 328 also includes a plurality of layers of periodically varying index of refraction. In some examples, the plurality of layers of the mirror surface 328 includes approximately 6 layers. Further, the periodically varying index of refraction of the mirror surface 328 is selected so as to reflect the reflected signal 336 towards the transmission surface 330, the reflected signal 336 being transmitted through the transmission surface 330 as a second output signal 342.

The mirror surface 328 has a normal line 344 that is substantially parallel to the normal line 340 of the 50:50 beam splitting surface 326. Accordingly, reflected signal 336 is incident on the mirror surface 328 at the angle θ relative to the normal line 344 and reflected at the same angle θ. In this manner, the first output signal 338 and second output signal 342 transmitted out of the small incident angle beam splitter 302A are substantially parallel to one another.

Referring to FIG. 3D, the small incident angle beam splitter 302B is similar in some respects to the small incident angle beam splitter 302A of FIG. 3C and is labeled with like reference numbers. It will be appreciated, with the benefit of the present disclosure, that the small incident angle beam splitter 302A of FIG. 3C has a 3-dimensional square or rectangle shape, while the small incident angle beam splitter 302B of FIG. 3D has a 3-dimensional rhomboid shape. Thus, in the example of FIG. 3D, the input surface 324 is substantially coplanar with the mirror surface 328 and the 50:50 beam splitting surface 326 is substantially coplanar with the transmission surface 330. Further, in the example of FIG. 3D, the input signal 334 experiences refraction at the input surface 324, the first output signal 338 experiences refraction at the 50:50 beam splitting surface, and the second output signal 342 experiences refraction at the transmission surface 330.

The input signal 334, reflected signal 336, first output signal 338 and second output signal 342 are also identified in FIG. 3A for reference.

With reference to FIGS. 3A and 3B, the second beam splitter 304 is configured similar to the small incident angle beam splitters 302A, 302B described with respect to FIGS. 3C and 3D in some embodiments. Generally, the second beam splitter 304 is configured to receive the first and second output signals 338 and 342 from the first beam splitter 302 and to generate two interference signals from each of the first and second output signals 338 and 342 in conjunction with the OPD compensator 306, wavelength tuner 308 and reflector 310.

The OPD compensator 306 is made of silicon in some examples. Generally, the OPD compensator 306 enables the demodulator 300 to operate a thermally by compensating an optical path difference introduced by environmental temperature variations. Accordingly, once the demodulator 300 is tuned to a particular central frequency, the OPD compensator 306 is configured to substantially prevent the central frequency from drifting if the temperature of the demodulator 300 varies during operation.

The wavelength tuner 308 includes two silicon wafers 346A, 346B that are each coupled to a corresponding thermoelectric cooler ("TEC") 348A, 348B. The TECs 348A, 348B independently regulate the temperatures of the silicon wafers 346A, 346B. In some embodiments the silicon wafer 346A is operated at a first temperature $T_1$ and the silicon wafer 346B is operated at a second temperature $T_2$ that is not equal to $T_1$. The difference between $T_1$ and $T_2$ is $|T_1-T_2|=\Delta T$. Further, in some embodiments, the temperatures $T_1$ and $T_2$ are centered about a central temperature $T_c=(T_1+T_2)/2$.

By operating the silicon wafers 346A, 346B at a predetermined $\Delta T$, a $\pi/2$ phase shift (or other desired phase shaft) is introduced into a particular optical path to facilitate demodulation of an incoming DQPSK signal, as will be explained below. By operating the silicon wafers 346A, 346B at a predetermined $T_c$, the demodulator 300 is tuned to a particular central wavelength. The predetermined $\Delta T$ and $T_c$ are set by appropriate selection of $T_1$ and $T_2$.

The reflector 310 is a mirror, for example. In some embodiments, the reflector 310 has a reflectivity substantially equal to 100%. Alternately, the reflector 310 has a reflectivity less than 100%. In the illustrated examples of FIGS. 3A and 3B, the reflector 310 and OPD compensator 306 are depicted as being separated from each other. In other embodiments, the OPD compensator 306 is coupled directly to the reflector 310, forming an integral component with the reflector 310.

The input collimator 314 is configured to collimate an incoming PSK signal received over an optical fiber 349A to generate the input signal 334. The output collimators 316A-316D are configured to collimate interference signals received from the second beam splitter 304 for insertion into optical fibers 349B-349E, respectively.

The redirecting elements 312A-312C are configured to redirect the interference signals 350, 352, 356 into the output collimators 316C, 316D, 316A, respectively. Each of the redirecting elements 312A-312C is a rhomboid-shaped optical element as illustrated in FIGS. 3A-3B.

B. Example Operation

In operation, and as seen in FIG. 3A, the input signal 334 is received by the first beam splitter 302 which splits the input signal 334 into first and second output signals 338, 342. The first and second output signals 338, 342 are then received by the second beam splitter 304. The second beam splitter 304 cooperates with the OPD compensator 306, wavelength tuner 308 and reflector 310 to generate two interference signals 350, 352 from the first output signal 338 and two interference signals 354, 356 from the second output signal 342.

Figure 3E:
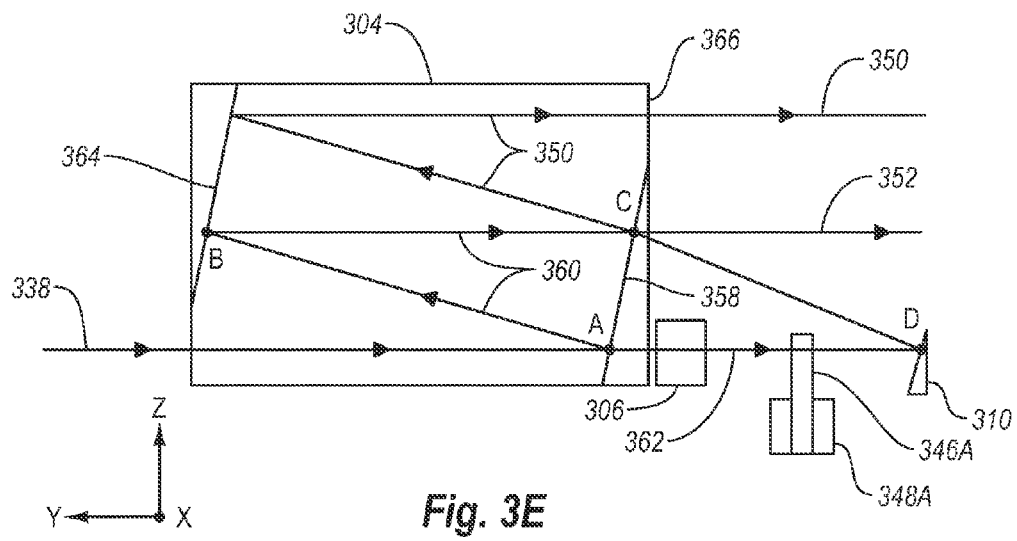
FIGS. 3E and 3F illustrate the generation of interference signals from the output signals of FIGS. 3C and 3D.
Figure 3F:
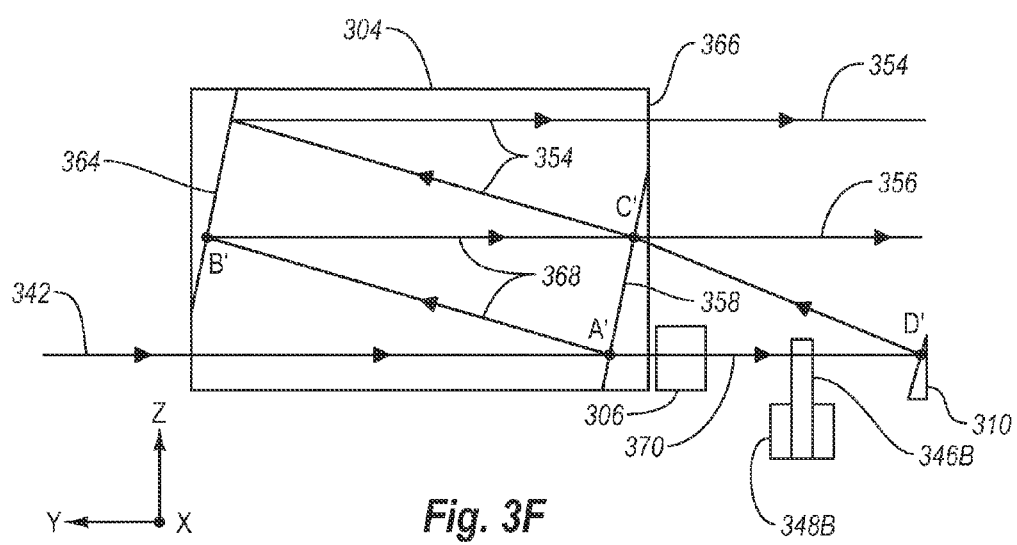

Additional details regarding generation of the interference signals 350, 352, 354, 356 are disclosed in FIGS. 3E and 3F. FIG. 3E depicts generation of the interference signals 350, 352 from the first output signal 338 and FIG. 3F depicts generation of the interference signals 354, 356 from the second output signal 342. Further, FIGS. 3E and 3F depict the second beam splitter 304 as being configured analogously to the small incident angle beam splitter 302A of FIG. 3C. In other embodiments, the beam splitter 304 is configured analogously to the small incident angle beam splitter 302B of FIG. 3D.

As shown in FIG. 3E, the first output signal 338 is received by the second beam splitter 304 and is split at point A on a 50:50 beam splitting surface 358 of the second beam splitter 304 into a reflected signal 360 and a transmitted signal 362. The reflected signal 360 is directed to a mirror surface 364 of the second beam splitter 304 where it impinges at point B and is reflected back toward the 50:50 beam splitting surface 358, impinging at point C. The reflected signal 360 follows a path A-B-C having a path length of L.

The transmitted signal 362 is transmitted through the OPD compensator 306 and the silicon wafer 346A towards the reflector 310. The transmitted signal 362 impinges on the reflector 310 at point D and is reflected back toward the 50:50 beam splitting surface 358, impinging at point C. The transmitted signal 362 follows a path A-D-C having a path length of L-ΔL. The difference ΔL in path length between the path A-B-C and the path A-D-C is generally configured to introduce a predetermined delay of about one bit period between the reflected signal 360 and the transmitted signal 362. In other embodiments, the difference ΔL is configured to introduce a predetermined delay that is more or less than one bit period.

In some embodiments, the ambient temperature of the demodulator 300, including the second beam splitter 304 and OPD compensator 306, varies during operation. The varying temperature changes the path length L of the reflected signal 360 along path A-B-C in some examples. Without introducing a corresponding change in the path length L-ΔL of the transmitted signal 362 along path A-D-C, the difference ΔL in path length between the path A-B-C and the path A-D-C varies with temperature, thereby introducing a temperature-dependent delay of more or less than one bit period between the reflected signal 360 and the transmitted signal 362. According to some embodiments, however, the demodulator 300 includes OPD compensator 306 positioned in the path A-D-C of transmitted signal 362. Similar to the second beam splitter 304, the OPD compensator 306 is affected by temperature. The OPD compensator 306 is configured to change the path length L-ΔL of the transmitted signal 362 to the same extent as the path length L of the reflected signal 360 is changed so as to substantially maintain ΔL at a fixed value.

Upon striking point C on the 50:50 beam splitting surface 358, the reflected signal 360 and the transmitted signal 362 constructively and destructively interfere with each other to generate amplitude-modulated interference signals 350 and 352, one of which is a constructive interference signal and the other of which is a destructive interference signal. From point C, the interference signal 350 is directed to the mirror surface 364 where it is reflected and then transmitted through a transmission surface 366 of the second beam splitter 304.

With combined reference to FIGS. 3A and 3E, the interference signal 350 passes above the wavelength tuner 308 and reflector 310 and is redirected by the redirecting element 312B to the output collimator 316C. The interference signal 352 also passes over the wavelength tuner 308 and reflector 310 and is redirected by redirecting elements 312B and 312C to the output collimator 316D. The interference signals 350, 352 are optionally provided from the output collimators 316C, 316D to paired optical detectors 320. Alternately or additionally, the output collimators 316C, 316D are omitted and the interference signals 350, 352 are provided directly to the paired optical detectors 320 and/or through one or more intervening elements, such as through one or more lenses. The outputs of the paired optical detectors 320 are then evaluated to recover a first tributary of the original input signal 334.

As best seen in FIG. 3F, the second output signal 342 is processed in a similar manner to the first output signal 338. In particular, the second output signal 342 is received by the second beam splitter 304 and is split at point A' on the 50:50 beam splitting surface 358 into a reflected signal 368 and a transmitted signal 370. The reflected signal 368 is reflected off the mirror surface 364 at point B' back toward the 50:50 beam splitting surface 358 and impinges at point C'. The reflected signal 368 follows a path A'-B'-C' having substantially the same path length L as the path A-B-C.

The transmitted signal 370 is transmitted through OPD compensator 306 and silicon wafer 346B towards reflector 310, impinging at point D' and reflecting back to point C' of the 50:50 beam splitting surface 358. The transmitted signal follows a path A'-D'-C' having substantially the same path length L-ΔL as the path A-D-C.

As already explained above with respect to FIG. 3E, the OPD compensator 306 is configured to change the path length L-ΔL of the transmitted signal 370 to the same extent as the path length L of the reflected signal 368 is changed so as to substantially maintain ΔL at a fixed value.

Upon striking point C' on the 50:50 beam splitting surface 358, the reflected signal 368 and the transmitted signal 370 constructively and destructively interfere with each other to generate amplitude-modulated interference signals 354 and 356, one of which is a constructive interference signal and the other of which is a destructive interference signal. From point C', the interference signal 350 is directed to the mirror surface 364 where it is reflected and then transmitted through transmission surface 366.

With combined reference to FIGS. 3A and 3F, the interference signal 354 passes above the wavelength tuner 308, reflector 310 and redirecting element 312A where it is received by the output collimator 316B. The interference signal 356 also passes over the wavelength tuner 308 and reflector 310 and is redirected by redirecting element 312A to the output collimator 316A. The interference signals 354, 356 are optionally provided from the output collimators 316B, 316A to paired optical detectors 318. Alternately or additionally, the output collimators 316B, 316A are omitted and the interference signals 354, 356 are provided directly to the paired optical detectors 318 and/or through one or more intervening elements, such as through one or more lenses. The outputs of the paired optical detectors 318 are then evaluated to recover a second tributary of the original input signal 334.

With combined reference to FIGS. 3E-3F, silicon wafers 346A, 346B are interposed in the paths A-D-C and A'-D'-C' traversed by transmitted signals 362, 370. As already mentioned above, the silicon wafers 346A, 346B are generally operated at temperatures $T_1$ and $T_2$ having a difference of ΔT and centered about a central temperature $T_c$. Where the silicon wafers 346A, 346B are substantially identical in composition and thickness to one another, the operation of the silicon wafers 346A, 346B at different temperatures $T_1$ and $T_2$ causes the silicon wafers 346A, 346B to exhibit different indices of refraction. The transmission of the transmitted signals 362, 370 through silicon wafers 346A, 346B exhibiting different indices of refraction introduces a phase shift between the transmitted signals 362, 370. As already mentioned above, the silicon wafers 346A, 346B are operated at a predetermined ΔT configured to introduce a π/2 phase shift in some embodiments. It will be appreciated, with the benefit of the present disclosure, that the introduction of the π/2 phase shift operates to correctly align the two tributaries of the original input signal 334 to each other.

Accordingly, as disclosed herein, the demodulator 300 is configured to receive a phase-modulated DQPSK signal and convert it to four amplitude-modulated interference signals. In some embodiments, the phase-modulated DQPSK signal has a 40 gigabit per second ("G") data rate, and each of the four amplitude-modulated interference signals has a 10 G data rate. Alternately, the data rate of the phase-modulated DQPSK signal and of each of the four amplitude-modulated interference signals may be different than 40 G and 10 G, respectively.

Alternately or additionally, the demodulator 300 can be configured to receive a phase-modulated DPSK signal and convert it to two amplitude-modulated interference signals. In this example, the first beam splitter 302 is omitted such that the second beam splitter 304 receives a single input signal that is a DPSK signal. The second beam splitter 304, OPD compensator 306, wavelength tuner 308 and reflector 310 then cooperate to generate two interference signals from the single input signal.

III. Second Embodiment

Figure 4A:
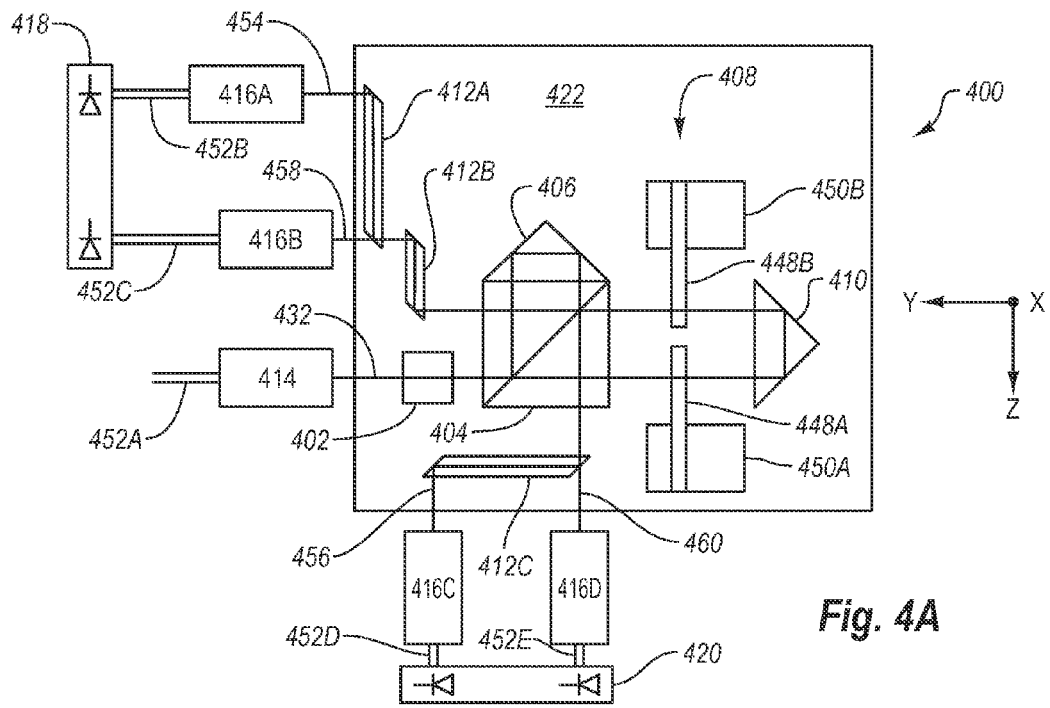
FIGS. 4A and 4B illustrate a second embodiment of a DQPSK demodulator that is configured to be implemented in the fiber optic communication system of FIG. 1.
Figure 4B:
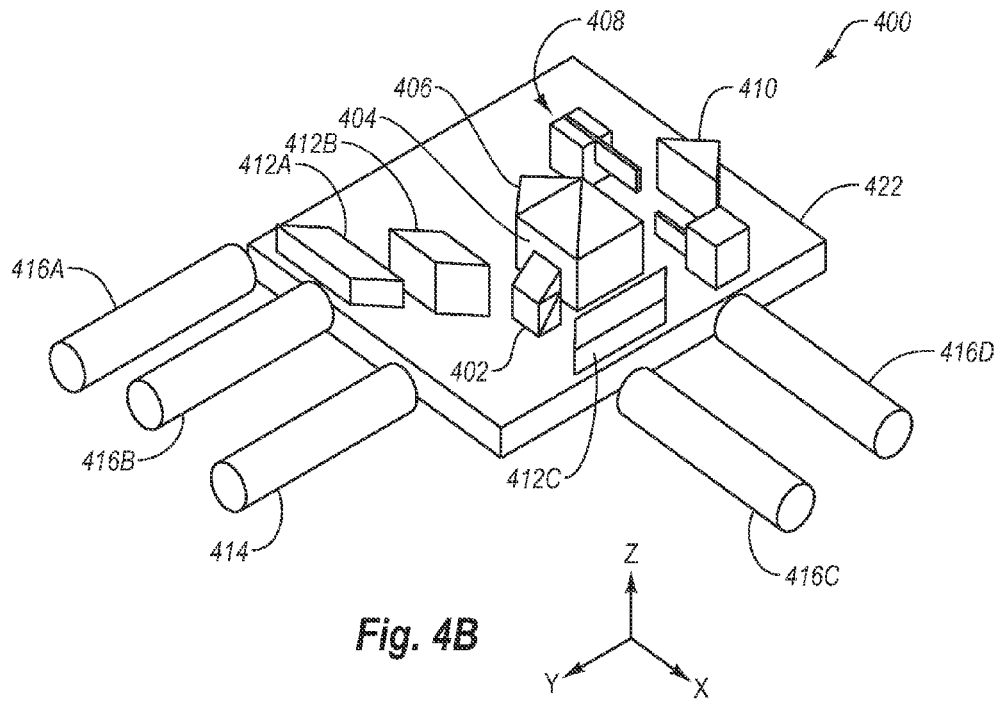

Referring to FIGS. 4A and 4B, a demodulator 400 according to a second example embodiment is disclosed. FIG. 4A illustrates a top view and FIG. 4B illustrates an isometric view of the demodulator 400. The demodulator 400 includes a first beam splitter 402, a second beam splitter 404, a first prism 406, a wavelength tuner 408 and a second prism 410. Optionally, the demodulator 400 further includes one or more redirecting elements 412A-412C, an input collimator 414, and a plurality of output collimators 416A-416D. Alternately or additionally, the demodulator 400 further includes one or more paired optical detectors 418, 420, illustrated in FIG. 4A. In some embodiments, the first beam splitter 402, second beam splitter 404, first prism 406, wavelength tuner 408, second prism 410 and redirecting elements 412A-412C are disposed on a substrate 422.

A. Beam Splitters

Each of the first and second beam splitters 402, 404 is a non-polarization dependent beam splitter according to some embodiments, such that each of the first and second beam splitters 402, 404 is configured to split an input signal into two output signals of approximately equal power without regard to the polarization state of the input signal.

Figure 4C:
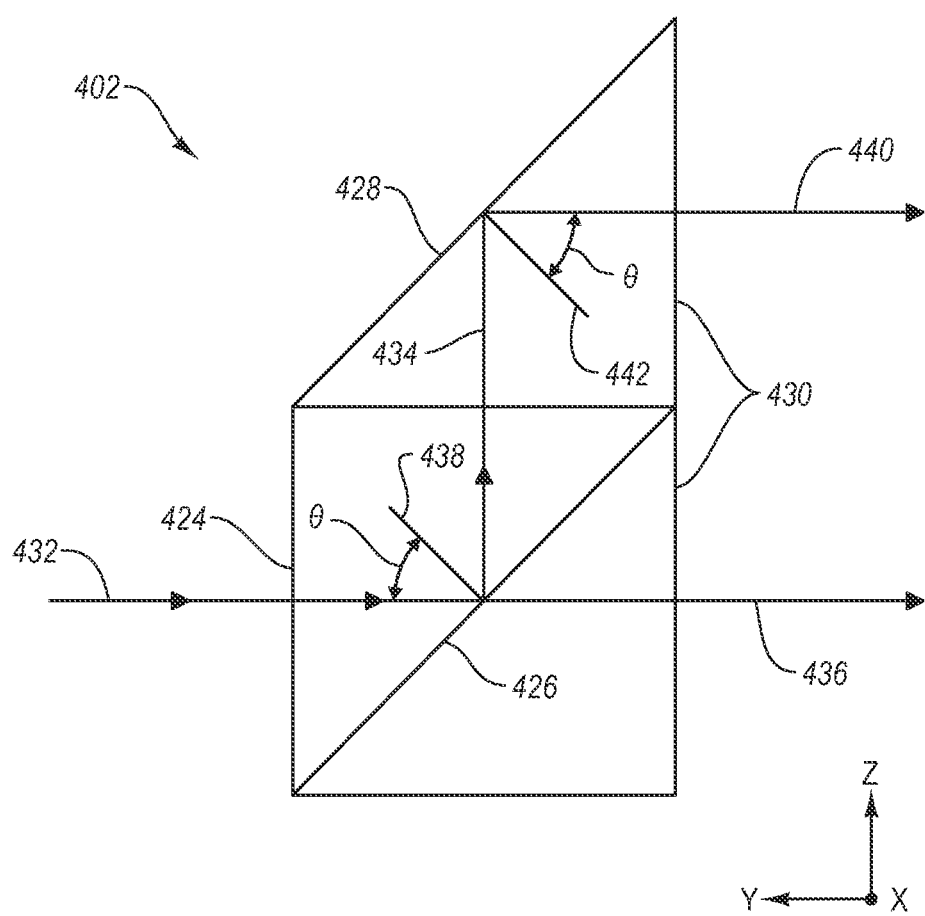
FIG. 4C illustrates an example of a first beam splitter that is configured to be implemented in the DQPSK demodulator of FIGS. 4A and 4B to generate two output signals from an input signal.

FIG. 4C depicts an example of the first beam splitter 402 according to some embodiments. The first beam splitter 402 includes an input surface 424, 50:50 beam splitting surface 426, a mirror surface 428, and a transmission surface 430.

The input surface 424 and the transmission surface 430 both include an antireflective coating so as to substantially prevent signals incident on those surfaces from being reflected.

The 50:50 beam splitting surface 426 includes a plurality of layers of periodically varying index of refraction. In some embodiments, the plurality of layers includes alternating layers of two materials, each material having a different index of refraction. Each layer optionally has a thickness of approximately $\lambda/4$, where $\lambda$ is the wavelength of an input signal. Alternately or additionally, the plurality of layers includes approximately 40 layers.

The periodically varying index of refraction of the 50:50 beam splitting surface 426 is selected so as to split an input signal 432 into two signals. In particular, the 50:50 beam splitting surface 426 splits the input signal 432 into a reflected signal 434 that is reflected towards the mirror surface 428 and a first output signal 436 that is transmitted through the 50:50 beam splitting surface 426 and the transmission surface 430. In some examples, the input signal 432 is a phase-modulated DQPSK signal.

As depicted in FIG. 4C, the 50:50 beam splitting surface 426 has a normal line 438 that is angularly offset from the input signal 432 by an angle $\theta$. In some embodiments, the angle $\theta$ is approximately 45 degrees.

The mirror surface 428 in some examples is uncoated and employs total internal reflection to reflect the reflected signal 434 towards the transmission surface 430, the reflected signal 434 being transmitted through the transmission surface 430 as a second output signal 440.

The mirror surface 428 has a normal line 442 that is substantially parallel to the normal line 438 of the 50:50 beam splitting surface 426. Accordingly, the reflected signal 434 is incident on the mirror surface 428 at the angle $\theta$ relative to the normal line 442 and reflected at the same angle $\theta$. In this manner, the first output signal 436 and second output signal 440 transmitted out of the first beam splitter 402 are substantially parallel to one another.

Accordingly, in some embodiments, the first beam splitter 402 splits the input signal 432 into first and second output signals 436, 440, with the first output signal 436 generally beneath the second output signal 440 in the arbitrarily-defined z-direction. Thus, the input signal 432 is labeled in FIG. 4A, but the first and second output signals 436, 440 are not labeled in FIG. 4A since they overlap one another.

Figure 4D:
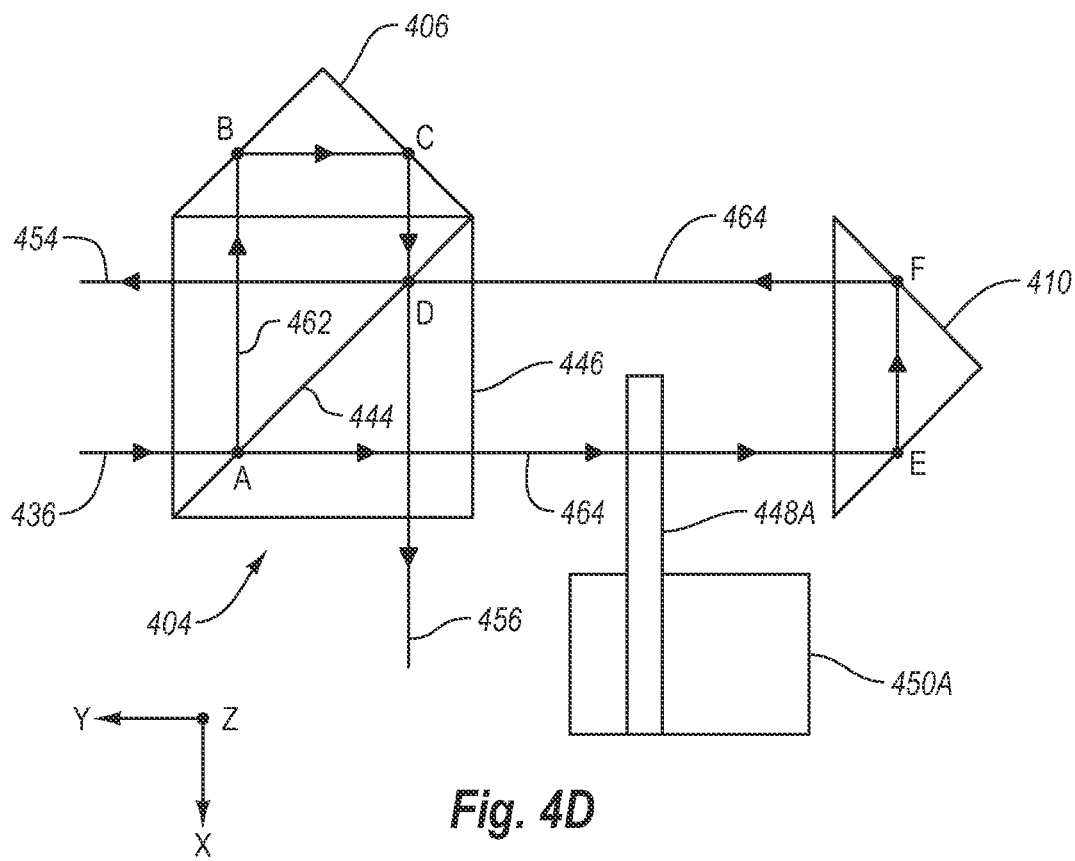
FIGS. 4D and 4E illustrate the generation of interference signals from the output signals of FIG. 4C.
Figure 4E:
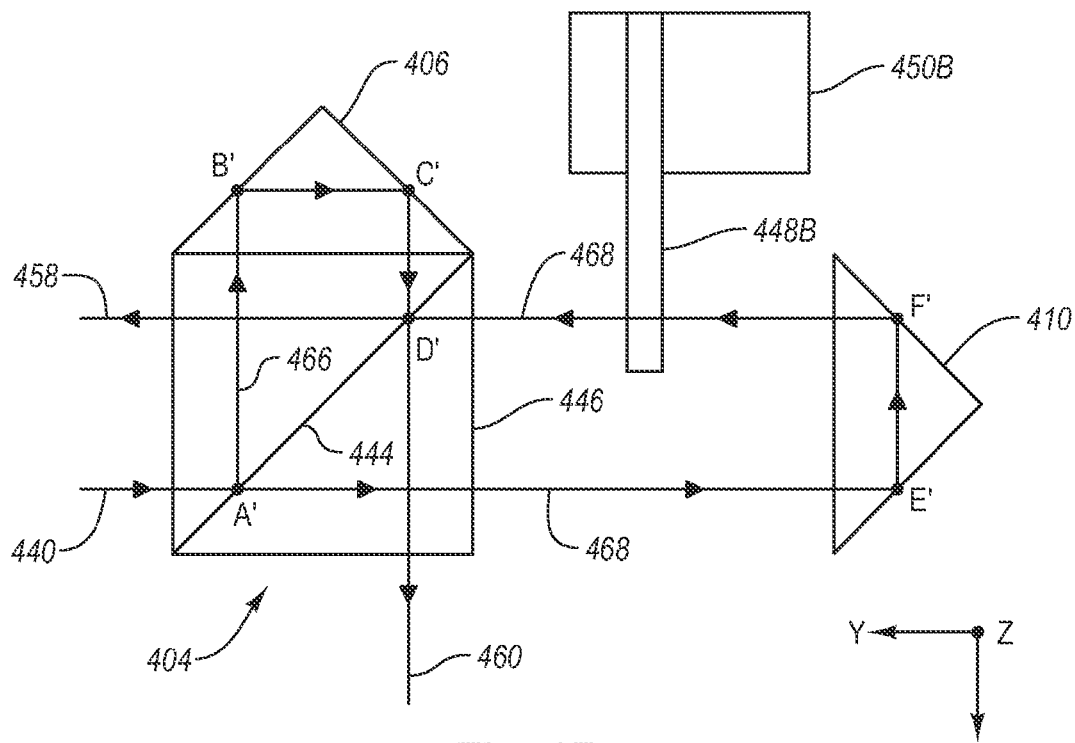

With reference to FIGS. 4D and 4E and according to some embodiments, the second beam splitter 404 is configured similar to the first beam splitter 402 in some respects. For instance, as illustrated in FIGS. 4D and 4E, the second beam splitter 404 includes a 50:50 beam splitting surface 444 and a transmissions surface 446. In contrast to the first beam splitter 402 which includes a mirror surface 428, the second beam splitter 404 lacks a mirror surface. Instead, the first prism 406 is coupled to the second beam splitter 404 for redirecting optical signals back into the second beam splitter 404, as will be described in greater detail below. Generally, however, the second beam splitter 404 is configured to receive the first and second output signals 436, 440 from the first beam splitter and to generate two interference signals from each of the first and second output signals 436, 440 in conjunction with the first prism 406, wavelength tuner 408 and second prism 410.

Referring again to FIGS. 4A and 4B, the wavelength tuner 408 includes two silicon wafers 448A, 448B that are each coupled to a corresponding TEC 450A, 450B. The wavelength tuner 408, including silicon wafers 448A, 448B and TECs 450A, 450B are substantially similar in composition and operation to the wavelength tuner 308 of FIGS. 3A-3F.

In some embodiments, each of the first and second prisms 406, 410 is a right angle prism.

The input collimator 414 is configured to collimate an incoming PSK signal received over an optical fiber 452A to generate the input signal 432. The output collimators 416A-416D are configured to collimate interference signals received from the second beam splitter 404 for insertion into optical fibers 452B-452E, respectively.

The redirecting elements 412A-412C are configured to redirect the interference signals 454, 456, 458 into the output collimators 416A, 416B, 416C, respectively. Each of the redirecting elements 412A-412C is a rhomboid-shaped optical element as illustrated in FIGS. 4A-4B.

B. Example Operation

In operation, and with combined reference to FIGS. 4A and 4C, the input signal 432 is received by the first beam splitter 402 which splits the input signal 432 into first and second output signals 436, 440. The first and second output signals 436, 440 are then received by the second beam splitter 404. The second beam splitter 404 cooperates with the first prism 406, wavelength tuner 408 and second prism 410 to generate two interference signals 454, 456 from the first output signal 436 and two interference signals 458, 460 from the second output signal 440.

Additional details regarding generation of the interference signals 454, 456, 458, 460 are disclosed in FIGS. 4D and 4E. FIG. 4D depicts generation of the interference signals 454, 456 from the first output signal 436 and FIG. 4E depicts generation of the interference signals 458, 460 from the second output signal 440. The silicon wafer 448B and TEC 450B have been omitted from FIG. 4D because the silicon wafer 448B is not disposed in the optical path of any of the signals illustrated in FIG. 4D. Similarly, the silicon wafer 448A and TEC 450A have been omitted from FIG. 4E because the silicon wafer 448A is not disposed in the optical path of any of the signals illustrated in FIG. 4E.

As shown in FIG. 4D, the first output signal 436 is received by the second beam splitter 404 and is split at point A on the 50:50 beam splitting surface 444 into a reflected signal 462 and a transmitted signal 464. The reflected signal 462 is redirected to the first prism 406 where it is reflected at points B and C back toward the 50:50 beam splitting surface 444, impinging at point D. The reflected signal 462 follows a path A-B-C-D having a path length of L.

The transmitted signal 464 is transmitted through the silicon wafer 448A towards the second prism 410 where it is reflected at points E and F back toward the 50:50 beam splitting surface 444, impinging at point D. The transmitted signal 464 follows a path A-E-F-D having a path length of L+ΔL. The difference ΔL in path length between the path A-B-C-D and the path A-E-F-D is generally configured to introduce a predetermined delay of about one bit period between the reflected signal 462 and the transmitted signal 464. In other embodiments, the difference ΔL is configured to introduce a predetermined delay that is more or less than one bit period.

Upon striking point D on the 50:50 beam splitting surface 444, the reflected signal 462 and the transmitted signal 464 constructively and destructively interfere with each other to generate amplitude-modulated interference signals 454 and 456, one of which is a constructive interference signal and the other of which is a destructive interference signal. From point D, the interference signals 454, 456 are transmitted out of the second beam splitter 404. With combined reference to FIGS. 4A and 4D, after exiting the second beam splitter 404, the interference signal 454 is redirected by redirecting elements 412B and 412A into output collimator 416A. After exiting the second beam splitter 404, the interference signal 456 is redirected by redirecting element 412C into output collimator 416C. As depicted in FIG. 4A, the interference signals 454, 456 are optionally provided from the output collimators 416A, 416C to a corresponding photodiode of paired optical detectors 418, 420. Alternately, the interference signals 416A, 416C to photodiodes on the same paired optical detector 418 or 420. Alternately or additionally, output collimators 416A, 416C are omitted and the interference signals 454, 456 are provided directly to photodiodes of the same or different paired optical detectors 418, 420.

As best seen in FIG. 4E, the second output signal 440 is processed in a similar manner to the first output signal 436. In particular, the second output signal 440 is received by the second beam splitter 404 and is split at point A' on the 50:50 beam splitting surface into a reflected signal 466 and a transmitted signal 468. The reflected signal 466 is reflected at points B' and C' of the first prism 406 back toward the 50:50 beam splitting surface 444 and impinges at point D'. The reflected signal 466 follows a path A'-B'-C'-D' having substantially the same path length L as the path A-B-C-D of FIG. 4D.

The transmitted signal 468 is received by the second prism 410 where it is reflected at points E' and F'. From F', the transmitted signal 468 is transmitted through the silicon wafer 448B before impinging on the 50:50 beam splitting surface 444 at point D'. The transmitted signal 468 follows a path A'-E'-F'-D' having substantially the same path length L+ΔL as the path A-E-F-D of FIG. 4D.

Upon striking the point D' on the 50:50 beam splitting surface 444, the reflected signal 466 and the transmitted signal 468 constructively and destructively interfere with each other to generate amplitude-modulated interference signals 458, 460, one of which is a constructive interference signal and the other of which is a destructive interference signal. From point D', the interference signals 458, 460 are transmitted out of the second beam splitter 404. With combined reference to FIGS. 4A and 4E, after exiting the second beam splitter 404, the interference signal 458 is redirected by redirecting element 412B and passes over redirecting element 412A into output collimator 416B. After exiting the second beam splitter 404, the interference signal 460 passes over redirecting element 412C into output collimator 416D. As depicted in FIG. 4A, the interference signals 458, 460 are optionally provided from the output collimators 416B, 416D to a corresponding photodiode of paired optical detectors 418, 420. Alternately, the interference signals 458, 460 are provided from output collimators 416B, 416D to photodiodes on the same paired optical detector 418 or 420. Alternately or additionally, output collimators 416B, 416D are omitted and the interference signals 458, 460 are provided directly to photodiodes of the same or different paired optical detectors 418, 420.

The outputs of the paired optical detectors 418, 420 are then evaluated to recover a first and second tributary of the original input signal 432. Furthermore, in some embodiments, the silicon wafers 448A, 448B are operated at a predetermined ΔT configured to introduce a π/2 phase shift so as to correctly align the two tributaries of the original input signal 432 to each other, analogous to the manner already explained above with respect to FIGS. 3E and 3F.

Accordingly, as disclosed herein, the demodulator 400 is configured to receive a phase-modulated DQPSK optical signal and convert it to four amplitude-modulated interference signals. In some embodiments, the phase-modulated DQPSK signal has a 40 G data rate, and each of the four amplitude-modulated interference signals has a 10 G data rate. Alternately, the data rate of the phase-modulate DQPSK signals and of each of the four amplitude-modulated interference signals may be different than 40 G and 10 G, respectively.

Alternately or additionally, the demodulator 400 can be configured to receive a phase-modulated DPSK signal and convert it to two amplitude-modulated interference signals. In this example, the first beam splitter 402 is omitted such that the second beam splitter 404 receives a single input signal that is a DPSK signal. The second beam splitter 404, first prism 406, wavelength tuner 408 and second prism 410 then cooperate to generate two interference signals from the single input signal.

Moreover, either or both of the demodulators 300, 400 of FIGS. 3A-4E can be implemented as a standalone optical assembly, integrated within a receiver optical subassembly ("ROSA"), or can otherwise be modified and/or adapted as desired to suit a particular adaption. Those skilled in the art will appreciate, with the benefit of the present disclosure, the modifications and adaptations, if any, that are needed to implement the demodulators 300, 400 in a desired application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A phase shift keyed signal demodulator comprising:
   a first small incident angle beam splitter configured to split an input signal into first and second output signals;
   a second small incident angle beam splitter positioned to receive the first and second output signals and configured to simultaneously split each of the first and second output signals into a transmitted signal and a reflected signal;
   a first optical path defined by an optical path of each transmitted signal from a 50:50 beam splitting surface of the second small incident angle beam splitter to a reflector and back to the 50:50 beam splitting surface;
   a second optical path defined by an optical path of each reflected signal from the 50:50 beam splitting surface to a mirror surface of the second small incident angle beam splitter and back to the 50:50 beam splitting surface;
   an optical path difference compensator positioned in the first optical path and configured to substantially maintain a predetermined difference between a length of the first optical path and a length of the second optical path under varying temperature conditions, the predetermined difference configured to introduce a delay between the transmitted signal and the reflected signal, each transmitted signal and corresponding reflected signal interfering with each other to generate a constructive interference signal and a destructive interference signal; and
   a wavelength tuner positioned in the first optical path, the wavelength tuner configured to tune the demodulator to a predetermined central wavelength and to introduce a phase shift between a first transmitted signal generated from the first output signal and a second transmitted signal generated from the second output signal.

2. The demodulator of claim 1, wherein the wavelength tuner includes:
   a first silicon wafer coupled to a first thermoelectric cooler, the first silicon wafer disposed in the first optical path of the first transmitted signal; and
   a second silicon wafer coupled to a second thermoelectric cooler, the second silicon wafer disposed in the first optical path of the second transmitted signal.

3. The demodulator of claim 1, wherein the 50:50 beam splitting surface includes a plurality of layers of periodically varying index of refraction.

4. The demodulator of claim 3, wherein the plurality of layers includes six layers, each layer having a thickness that is approximately equal to one-fourth the wavelength of the input signal.

5. The demodulator of claim 1, wherein the 50:50 beam splitting surface has a normal line that is angularly offset with respect to a direction of propagation of the transmitted signal, the angular offset being between 7 degrees and 15 degrees.

6. The demodulator of claim 5, wherein the angular offset is approximately 10 degrees.

7. The demodulator of claim 1, wherein each of the first and second small incident angle beam splitters comprises a non-polarization dependent beam splitter.

8. The demodulator of claim 1, further comprising an input collimator positioned to collimate the input signal into the first small incident angle beam splitter.

9. The demodulator of claim 1, further comprising a plurality of output collimators, each positioned to receive one of the constructive or destructive interference signals generated from the first or second output signals.

10. The demodulator of claim 9, further comprising a plurality of redirecting elements positioned to redirect at least some of the constructive and destructive interference signals generated from the first and second output signals into the plurality of output collimators.

11. The demodulator of claim 1, wherein the optical path difference compensator is integrally formed with the reflector.

12. The demodulator of claim 1, wherein the optical path difference compensator comprises silicon.

13. The demodulator of claim 1, wherein the input signal comprises a phase-modulated optical signal and each of the constructive and destructive interference signals comprises an amplitude-modulated optical signal.

14. A phase shift keyed signal demodulator comprising:
   a first non-polarization dependent beam splitter configured to split an input signal into first and second output signals;
   a second non-polarization dependent beam splitter positioned to receive the first and second output signals and configured to simultaneously split each of the first and second output signals into a reflected signal and a transmitted signal;
   a first optical path defined by an optical path of each reflected signal from a 50:50 beam splitting surface of the second non-polarization dependent beam splitter to a first prism and back to the 50:50 beam splitting surface;
   a second optical path defined by an optical path of each transmitted signal from the 50:50 beam splitting surface to a second prism and back to the 50:50 beam splitting surface, wherein the first optical path is different in length than the second optical path, the length difference configured to introduce a delay between the reflected signal and the transmitted signal, each reflected signal and corresponding transmitted signal interfering with each other at the 50:50 beam splitting surface to generate a constructive interference signal and a destructive interference signal; and
   a wavelength tuner positioned in the second optical path, the wavelength tuner configured to tune the demodulator to a predetermined central wavelength and to introduce a phase shift between a first transmitted signal generated from the first output signal and a second transmitted signal generated from the second output signal.

15. The demodulator of claim 14, wherein the wavelength tuner includes:
   a first silicon wafer coupled to a first thermoelectric cooler, the first silicon wafer disposed in the second optical path of the first transmitted signal; and
   a second silicon wafer coupled to a second thermoelectric cooler, the second silicon wafer disposed in the second optical path of the second transmitted signal.

16. The demodulator of claim 14, wherein the 50:50 beam splitting surface includes a plurality of layers of periodically varying index of refraction, the plurality of layers including approximately forty layers, each layer having a thickness that is approximately equal to one-fourth the wavelength of the input signal.

17. The demodulator of claim 14, further comprising an input collimator positioned to collimate the input signal into the first non-polarization dependent beam splitter.

18. The demodulator of claim 14, further comprising a plurality of output collimators, each positioned to receive one of the constructive or destructive interference signals generated from the first or second output signals.

19. The demodulator of claim 18, further comprising a plurality of redirecting elements positioned to redirect at least some of the constructive and destructive interference signals generated from the first and second output signals into the plurality of output collimators.

20. The demodulator of claim 14, wherein the input signal comprises a differential quadrature phase shift keyed optical signal.

\* \* \* \* \*